(No Model.)  5 Sheets—Sheet 3.

F. MURPHY.
DREDGING MACHINE.

No. 461,193. Patented Oct. 13, 1891.

Witnesses
Fredk H Mills
A. Ward

Inventor
Francis Murphy
By Chas. G. Page
Atty (No Model.) 5 Sheets—Sheet 5.

F. MURPHY.
DREDGING MACHINE.

No. 461,193. Patented Oct. 13, 1891.

Witnesses
W. Roully
Fredk. H. Miles.

Inventor
Francis Murphy
By Chas. G. Page
Atty.

United States Patent Office.

FRANCIS MURPHY, OF CHICAGO, ILLINOIS.

DREDGING-MACHINE.

SPECIFICATION forming part of Letters Patent No. 461,193, dated October 13, 1891.

Application filed March 2, 1891. Serial No. 383,442. (No model.)

*To all whom it may concern:*

Be it known that I, FRANCIS MURPHY, a citizen of the United States, residing at Chicago, in the county of Cook and State of Illinois, have invented a certain new and useful Improvement in Dredging-Machines, of which the following is a specification.

My invention relates more particularly to dredging-machines in which the dredging or excavating devices are carried by a suitably-constructed vessel and adapted for service in the formation of canals.

The object of my invention, generally stated, is to provide a highly-efficient and economically-operating dredging-machine capable of rapidly and effectively performing a large amount of work and so adapted and arranged that it may economically and without difficulty dig its own floatage.

Further objects are to so construct and arrange the machine that it can be easily controlled by an engineer on board the vessel and readily positioned for work both as a whole and in respect to its excavating and discharging members; to permit the machine while digging its own floatage to discharge well onto the banks alongside the canal which it is forming; to balance the vessel while the work last mentioned is being performed; to avoid all spilling of the excavated material, and thereby keep the machinery free from clogging and dispense with all necessity of redredging; to provide novel and improved means for supporting the excavating-buckets, and to provide various novel and improved details and features of combination and arrangement, all serving to increase the general efficiency of dredging-machines.

To the attainment of the foregoing and other useful ends my invention consists in matters hereinafter set forth.

In a dredging-machine characterized by my invention I provide a vessel, of any suitable construction, with an endless chain of excavating-buckets arranged in front of the vessel and with a conveyer arranged to take the excavated material from the excavating-buckets and discharge the same onto an adjustable discharging-conveyer, which is supported by a revolving tower. By thus arranging the excavating-buckets to dig ahead of the vessel the machine can dig its own floatage, and by providing in connection with such arrangement a revolving or rotary adjustable tower and a conveyer extending therefrom the tower can be adjusted so as to permit the conveyer to discharge the excavated material at either side of the canal. As a means for balancing the machine I provide a float, which is arranged alongside of and attached to the vessel. Hence when the discharging-conveyer, which is of considerable length, is extended laterally from either side of the vessel the float will balance the same. As a further and important feature I provide a triangular frame, which is pivotally supported upon the vessel and extended forwardly from the same. The forward side of this triangular frame is adapted to provide a ladder for the endless chain of excavating-buckets and is arranged so that whether the frame is swung down for deep excavating or raised for comparatively shallow work the ascending excavating-buckets shall travel along a plane which is either vertical or slightly inclined from the vertical. By such arrangement the excavated material will not spill from the buckets, and the latter can cut from bottom to top of a high bank, and thereby avoid the disadvantage attendant upon making an under-cut only and relying upon the caving in of the earth above the under-cut. The formation of the triangular frame also permits it to be swung down to any desired extent for deep work, and, further, permits the utilization of one of its sides as a frame-support for an endless conveyer, which serves to receive all of the excavated material discharged from the excavating-buckets at the upper end of the ladder and convey the same to the discharging-conveyer, which can be adjusted for dumping the excavated material at either side of the canal. The discharging-conveyer is swung horizontally by turning the tower, and as a means for varying the height of its discharge end it is pivotally supported at its inner end upon the tower and swung up and down to desired positions by chains or cables, which serve both as stay and adjusting devices and which are wound upon and unwound from winding-drums, as occasion may require. The endless chain of excavating-buckets and the conveyer onto which they discharge are conveniently operated by chain gearing in or on the vessel, and the discharging-conveyer is conveniently operated from an engine in the tower.

Various details constituting further matters of improvement are hereinafter set forth.

In the accompanying drawings.

The barge or vessel A is operated by a propeller B, which not only serves as a means for propelling the vessel from place to place in navigable water, but also as a means for positioning it in place for action and advancing it as the work progresses.

The ladder C, which serves to support an endless chain of buckets D, is arranged in front of the bow or forward extremity of the vessel and is supported so that it can be raised and lowered in conformity with the required depth of excavation to be made. This arrangement of the ladder and buckets is of importance, since it permits the excavator to excavate and dig its way into banks in a manner to prepare its own floatage. Said arrangement also involves as a further important advantage the arrangement and positioning of the ladder in a way to permit the buckets to run approximately vertically, and thereby not only avoid spilling out the material, but also allow them to cut away the bank from bottom to top and without making merely an under-cut, as hereinafter more fully set forth. The ladder comprises a strong frame provided at its ends with polygonal rolls C′ or other known substitute found in dredging-machines for the endless chain of buckets D, which chain of buckets is driven by applying the driving-power to the upper roll.

Figure 1:
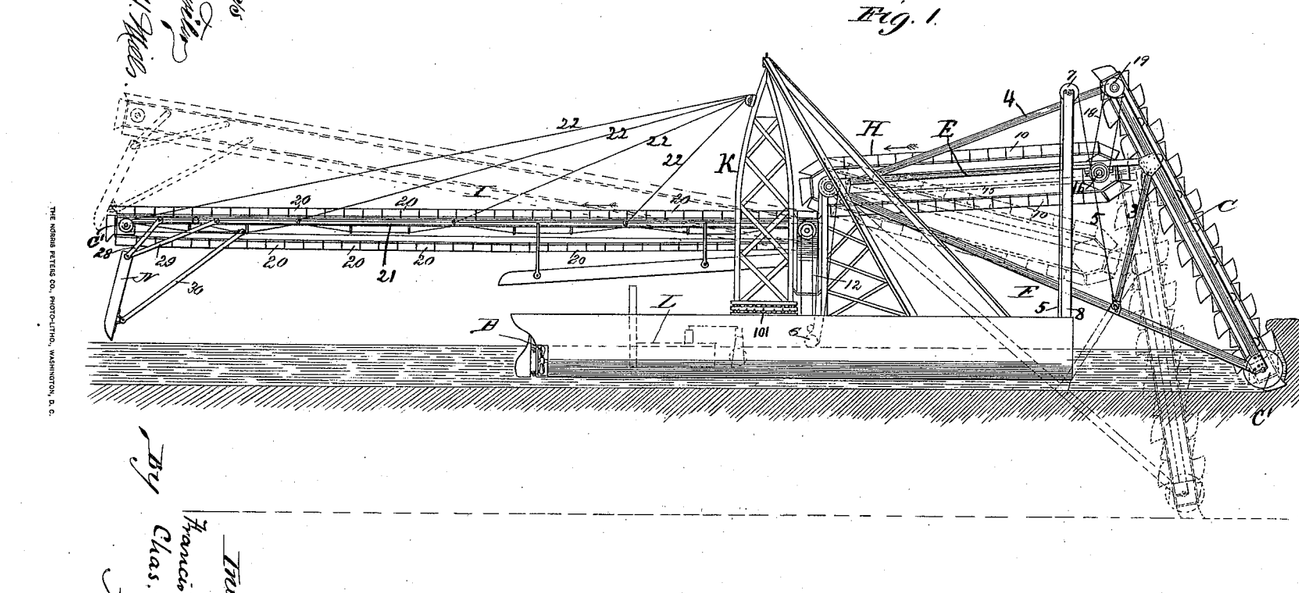
Figure 1 represents in side elevation a dredging-machine embodying my invention.
Figure 2:
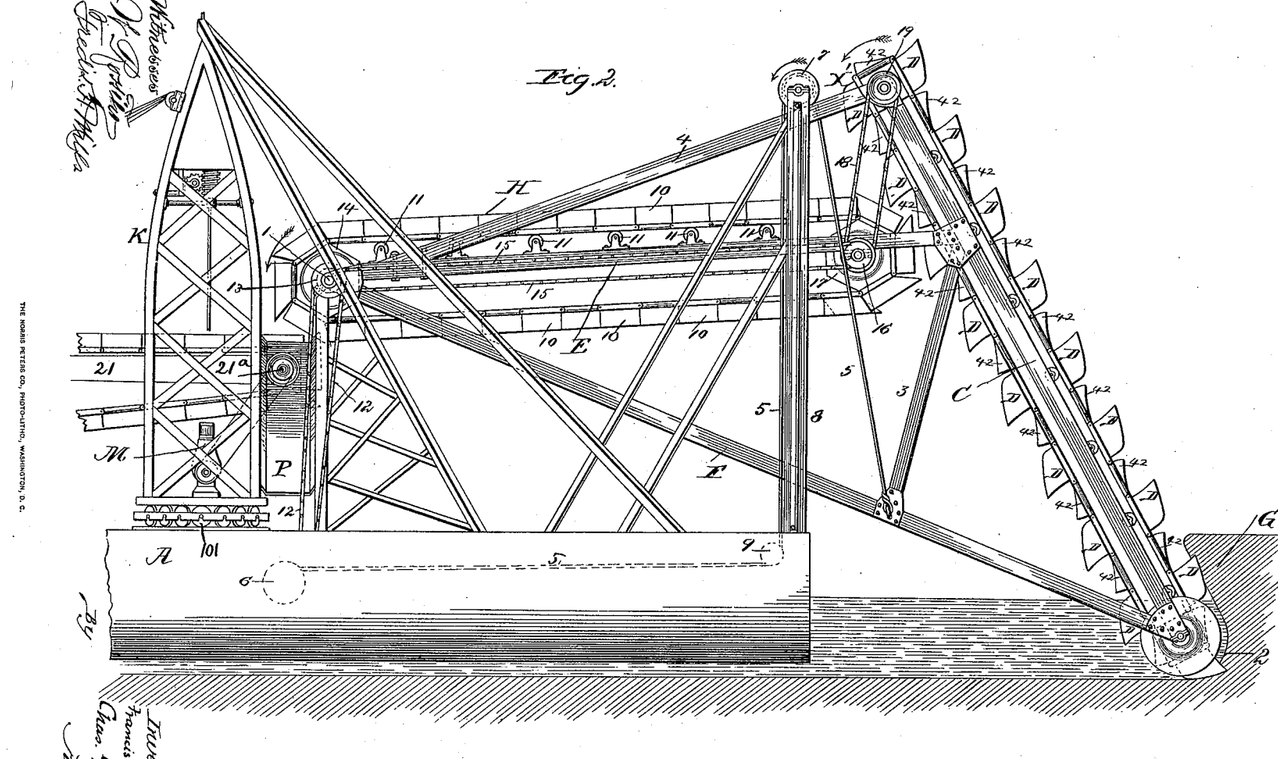
Fig. 2 represents in side elevation, on a somewhat larger scale, the middle and forward portions of said machine, it being observed that in Figs. 1 and 2 certain details shown in certain other figures are for convenience of illustration omitted.

The ladder C constitutes one of the sides of a triangle whereof the two remaining sides are formed by the frames E and F, the whole serving to form a triangular frame or structure C, E, and F, which is pivotally held at 1, so that it can be swung up and down in order to raise and lower the endless chain of buckets D. This triangular frame affords a simple, economical, comparatively light, and at the same time exceedingly strong device, which operates as a swinging arm pivotally supported from and at a suitable height above the vessel A, and by reason of its triangular form the ladder which forms one of the three sides of the triangle can be maintained in a nearly-vertical position, whether lowered for deep excavating, as shown in dotted lines, Fig. 1, or raised for more shallow excavating, as shown in full lines in Figs. 1 and 2. Referring, for example, to Fig. 2, it will be seen that, owing to the comparatively slight inclination of the ladder, which may be said to form the outer or forward side of the triangle, the buckets will cut from the base to the top of the bank G, whether high or low, and thus make a clean cut, each bucket simply taking up the earth which it has pared off from the side of the bank. The advantage of this will be understood by comparing it with excavators in which the location and arrangement of the ladder necessitate such inclination on the part thereof that should it be attempted to dig in front of the vessel it would only allow the buckets to make an under-cut at the point 2 and hence by thus digging under the bank necessitate a reliance upon the upper portion of the bank falling down when sufficiently undermined. It will also be seen that the last-mentioned undesirable inclination of the ladder would cause the filled bucket to travel in such position that much of the soil would spill therefrom.

The triangular frame C E F is strengthened by struts or braces 3 and 4, which are disposed in a way to give great strength to the frame as a whole, and also specially and effectively to brace the ladder. The ladder can be raised and lowered by one or more chains or cables 5, connected with the triangular frame and carried back to a winding-drum 6 in or on the vessel, as indicated in dotted lines in Fig. 2. As shown in said figure, a chain or cable 5 is attached to the lower side F of the triangular frame and on its way back to the winding-drum is carried up to and over an elevated pulley 7 on an upright 8, which rises from the forward end portion of the vessel. From said elevated pulley the chain or cable passes down to and about a guide-pulley 9, (indicated in dotted lines in Fig. 2,) and thence it passes back to the winding-drum 6, which can be operated from the engine in any suitable way. At the point where the buckets are inverted at the upper end of the ladder the soil is discharged therefrom and dropped onto an endless conveyer H, which is supported by the upper side E of the triangular frame. The utilization of said side of the triangular frame as a support for the conveyer avoids multiplying the framework and further involves the features of compactness and general convenience, it being observed that whether the triangular frame is swung up or down its upper side E will proximate sufficiently to the horizontal to permit the conveyer to effectively carry the material.

The conveyer H comprises an endless chain or series of buckets 10 and has its upper leaf suitably supported from the upper side E of the triangular frame by rolls 11. The conveyer H is driven from the engine by a chain belt 12, which passes up from the engine to a sprocket-pulley 13 on the polygonal roll 14 for the conveyer at the discharge end of the latter. The pulley 13 is connected by a chain belt 15 with a like pulley 16 on the polygonal roll 17 for the conveyer at the receiving end of the latter, and said pulley 16 is by a chain belt 18 connected with a pulley 19 on the upper roll for the endless chain of buckets as a means for operating said roll and thereby driving said endless chain of buckets.

The carrier or conveyer H is arranged between the endless chain of buckets D and a long swinging conveyer I as a means for conveying material from the former to the latter. The conveyer I is arranged to receive the material from the conveyer H and discharge the same at some desirable point, such as on the bank alongside the stream or canal or into a scow or the like, as may be desired. The conveyer I (which I may term the "discharging-conveyer" in contradistinction to the intermediate conveyer H) is supported by and arranged to extend from a revolving tower K. The revolving tower K rises from about the middle of the vessel and is supported upon anti-friction rolls 101, so that it can be readily turned from the engine through the medium of any suitable power-transmitting connection. I do not regard it as necessary to particularly illustrate devices for operating the tower from an engine L, (indicated in dotted lines in Fig. 1,) since the construction of means for such purpose—for example, gearing or the like—will be readily understood by any practical mechanic and can be readily supplied without special illustration herein.

The discharging-conveyer I comprises an endless chain or series of buckets 20, arranged to pass about suitable polygonal rolls C′ on a frame 21, which is at one end pivoted at 21$^a$ upon the tower, so as to permit it to be swung up and down. By such arrangement the tower can be turned about a vertical axis in order to permit the conveyer I to discharge at either side of the vessel and hence dump the material upon either bank of the canal, and, further, the discharge end of the conveyer can be raised and lowered, according to requirements, by tilting the conveyer-frame upon its pivotal support.

Figures 7, 8, 9, 10, 11, 12, 13, 14:
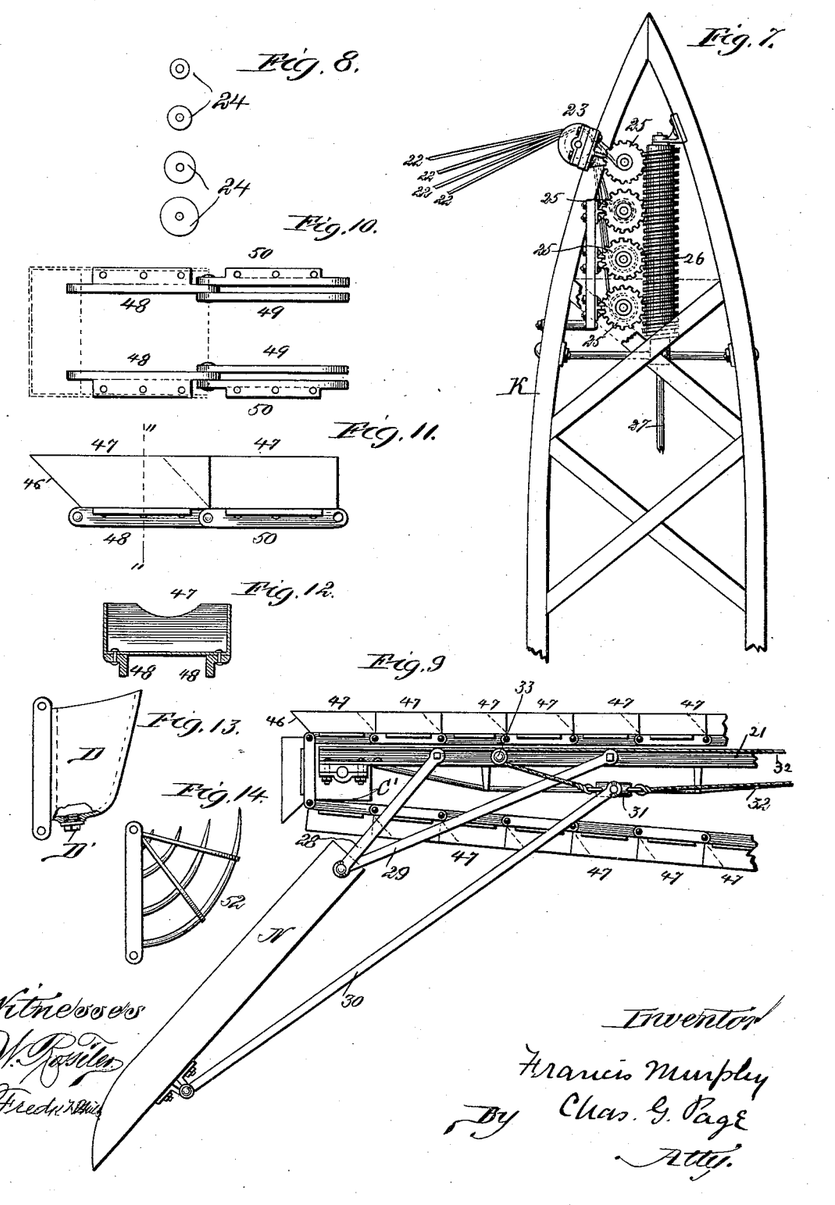
Fig. 7 represents the upper portion of the revolving tower and illustrates means for winding and unwinding the chains or cables 22, by which the discharging-conveyer I is raised and lowered, the ends of the differently-sized rolls being indicated by dotted-line circles.
Fig. 8 illustrates the differently-sized winding-drums for the chains or cables 22.
Fig. 9 represents in side elevation the outer end portion of the conveyer I.
Fig. 10 illustrates a portion of one of the conveyer-chains.
Fig. 11 is a side view of a portion of one of the conveyers.
Fig. 12 is a section on line 11 11 in Fig. 10.
Fig. 13 represents one of the excavating-buckets with a portion thereof broken away, so as to show a plug D′, which can be removed when it is desired to provide a vent-hole in the bottom of the bucket.
Fig. 14 shows a construction of excavating-bucket which can be used for certain kinds of soil and for broken stone.

As a means for upholding and steadying and also for raising and lowering the discharge-conveyer I provide the tower with a set of winding-drums, which are operated from the engine and from which chains or cables 22 are carried to and connected with the conveyer-frame at different points. The arrangement of these winding-drums is best illustrated in Figs. 7 and 8. The chains or cables pass over pulleys at 23 (an indication of one pulley at such point being sufficient) and thence severally connect with the winding-drums 24. These are differently sized, as shown by dotted-line circles, so as to compensate for the varying extent of motion which the conveyer-frame will have at different points along its length when it is tilted and for the respective relations of such points to the points at which the winding-drums 24 or guide-rollers 23 are stationed and for the positions of such drums relatively to the point at which the conveyer-frame is pivoted. Thus it will be obvious that during a given extent of swing on the part of the conveyer-frame the chain or cable attached to the conveyer-frame nearest its pivotal point need not be wound on its allotted drum to the same extent that the chain or cable nearest the outer end of the conveyer-frame should be wound on its allotted drum. The drums are not shown mathematically proportioned with reference to such winding; but such is a simple matter of calculation, and the principle involved can be readily understood from the foregoing. The desired result could be attained by operating a set of drums all of the same size by differently-sized gearing; but I prefer employing drums of different sizes. As illustrated in Fig. 7, for example, the winding-drums 24 are provided with worm-wheels 25, which are all engaged by a worm 26 on a vertically-arranged driving worm-shaft 27. Said worm-shaft 27 has its bearings on the tower and is arranged centrally within the same, so that the tower can be turned about the axis of said shaft. The shaft 27 extends down toward the vessel and is understood to be operated from an engine M within the tower.

The discharging-conveyer I is provided at its outer end with an adjustable tilting chute N, which is arranged to take the material from the discharge end of the conveyer and deliver it to the desired locality. The chute N is hinged to the elevator-frame so that it can be tilted in conformity with the height its discharge end should occupy, and may also be swung up so as to practically extend the length of the conveyer. The rear end of the chute N is connected with the conveyer-frame by arms 28 and 29, forming a bracket or support to which the inner end of the chute is pivoted, permitting the latter to be swung bodily with the conveyer, and also allowing it to be tilted about its pivotal connections with the arms, which are understood to be in pairs, respectively fixed to opposite sides of the chute.

As a means for adjusting the chute with reference to the desired position of its discharge end I pivotally attach the forward end of a link 30 (or links) to the chute at a point near the discharge end thereof and pivotally attach the rear end of the link (or links) to a block or bearing 31, which forms a link in the adjusting chain or cable 32. This chain or cable 32 passes about a pulley 33, arranged on the conveyer-frame near the forward end thereof, as in Fig. 9, and both its ends extend back along the frame 21 to the tower, where they can be operated either by a crank and windlass or by a winding-drum actuated from the tower-engine. It will be observed that the chain or cable 32 is arranged somewhat as an endless belt, so that it can be drawn in either direction for the purpose of swinging the chute one way or the other, as may be necessary.

Figures 3, 4, 5, 6:
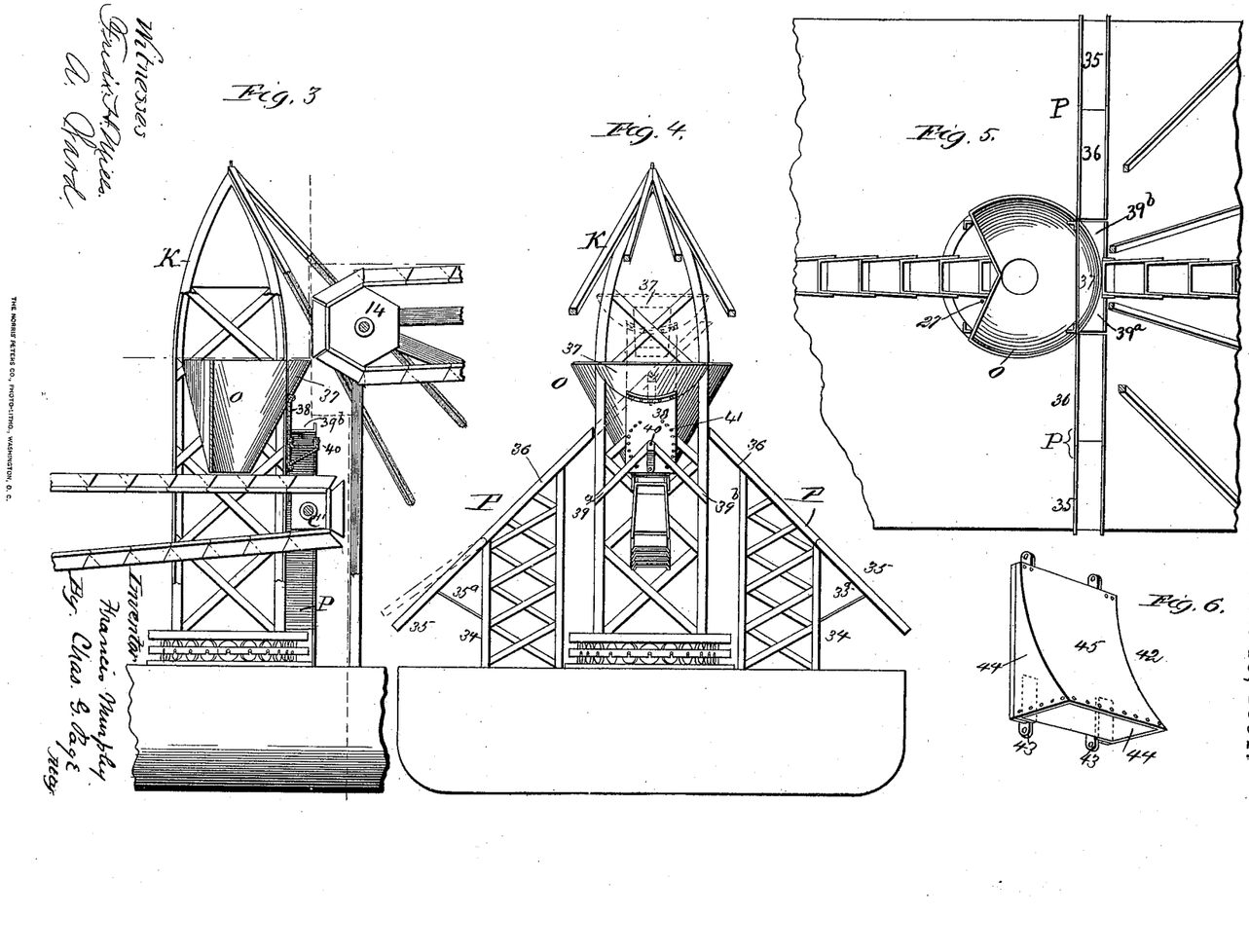
Fig. 3 represents the revolving tower, partly in vertical section and partly in elevation, and includes end portions of the two conveyers and a hopper, which latter is shown in vertical central section.
Fig. 4 is a front elevation of the revolving tower and illustrates the side delivery-chutes P, the hopper, and the means for directing the excavated material onto one or the other or both of said chutes.
Fig. 5 is a top plan view of Fig. 4.
Fig. 6 represents one of the guards or deflectors for the endless chain of excavating-buckets.

In order to direct the material from the intermediate conveyer H onto the discharging-conveyer I, I provide a hopper O, Figs. 3, 4, and 5, which is supported within the revolving tower and arranged to receive the material from the discharge end of the conveyer H and direct the same onto the receiving end of the conveyer I.

Provision is also made for a side delivery independent of the conveyer I, a prominent feature involved in such arrangement being the utilization at will of one or the other of two laterally-arranged conveyers or chutes P, which are short in comparison with the long conveyer I, and which can therefore be used for dumping at points as close as may be desired to the sides of the vessel—for example, into a scow or the like—it being observed that the conveyer I is made of considerable length, so that it can discharge well onto the banks along the canal. The chutes P are arranged upon supports 34 at opposite sides of the tower and have their outer end portions 35 hinged to their inner end portions 36, so that the discharge ends of the chutes can be adjusted in height. Any suitable device can be employed for adjusting the outer end portions 35 of said chutes. Hence I have simply shown adjusting-rods 35ª, which can at their lower ends be adjustably held in suitable bearings or notches.

In order to permit the material from the conveyer H to discharge onto the chutes P, a section 37 of the hopper O is made separate from the remaining portion of the hopper and arranged so that it can be raised from its position shown in full lines, Figs. 3, 4, and 5, to the position indicated in dotted lines in Fig. 4. A deflecting-plate 38 is attached to and arranged to depend from the hopper-section 37, and a couple of ways or chute portions 39 are attached to the plate 38. The hopper-section 37, with its pendent plate 38, can be raised so as to bring the outer ends of the ways or chute sections 39 into alignment with the inner ends of the chutes P, in which case the material discharged from the conveyer H will strike the plate 38 and be directed onto the ways or chute-sections 39, which will direct the same to the chutes P. An arrangement can also be made whereby the plate 38 shall direct the material onto one or the other of the side chutes, and to such end the ways or chute-sections 39 can be pivoted at 40 to the plate 38. When, therefore, the hopper-section 37 and plate 38 are raised, as in dotted lines, Fig. 4, either one of the ways or chute-sections 39 can be swung up and so held, while the other way or chute-section can be permitted to register with one of the chutes P, and hence direct the material to the same.

Any suitable means can be provided for raising and lowering the hopper-section 37, and, since a great variety of devices for such purpose can be readily made by an intelligent workman, I have not regarded it as necessary to illustrate any particular means. In like manner means can be supplied for adjusting the ways or chute-sections 39. Hence I have simply shown in the plate 38 a line of holes 41, in which pins on the chute-sections 39 can be inserted, so as to hold the latter at desired angles.

With reference to certain details of construction I provide, in connection with the endless chain of scoops or buckets D, a series of guards or deflectors 42, which alternate with the buckets, as shown in Fig. 2. The deflectors are adapted to direct the material discharged from the buckets onto the conveyer H and to prevent the material which is discharged from an inverted bucket from dropping onto the bucket next below it. The construction of these deflectors will be best understood by reference to Fig. 6, wherein a deflector 42 is shown attached to a couple of links 43 of the chain which carries the buckets. The deflector shown in said figure is preferably made of sheet metal and formed with sides 44, which are secured to the links, and with a curved deflecting-face 45. Referring now to Fig. 2, it will be seen that the bucket at the point X' is inverted and in position to discharge its contents, and that the deflector next below it (but of course ahead of the bucket so far as the direction of movement of the endless chain is concerned) will prevent the material thus discharged from falling onto the next lower bucket, and also direct the same onto the conveyer H.

The buckets and chains of the conveyers

H and I are constructed and arranged alike. Hence a description of the details of the conveyer I will serve for both conveyers.

Referring to several of the figures on Sheet IV of the drawings, it will be seen that the front ends 46 of the pans or buckets 47 incline upwardly and forwardly, so that while the buckets are being carried by straightened portions of the belt the forwardly-projecting end portions of each of such buckets can extend into the rear portion of the bucket next ahead of it, as illustrated in Fig. 5, wherein portions of the conveyers H and I are shown. To permit this temporary interlocking or fitting together of the buckets, each bucket is open at its rear end and formed with longitudinal sides, which converge toward the front end of the bucket. Said arrangement of buckets effectively prevents the soil from spilling out while being conveyed from the receiving end to the discharge end of the conveyer. These buckets will, however, separate from one another at the point of discharge, as shown in Fig. 9, where a bucket at the discharge end of the conveyer is shown in position to discharge onto the chute N. The chains of the conveyers are formed by flanged single links 48, alternating with duplex links 49 and 50, as in Fig. 10, the outer links 50 of said duplex links being flanged. The buckets are bolted or riveted to the flanges of the links 48 and 50, as illustrated in Figs. 11 and 12.

The endless chain for the buckets D and guards or deflectors 42 can also be constructed like the chains for the conveyers H and I, and hence need not be further described.

Figure 15:
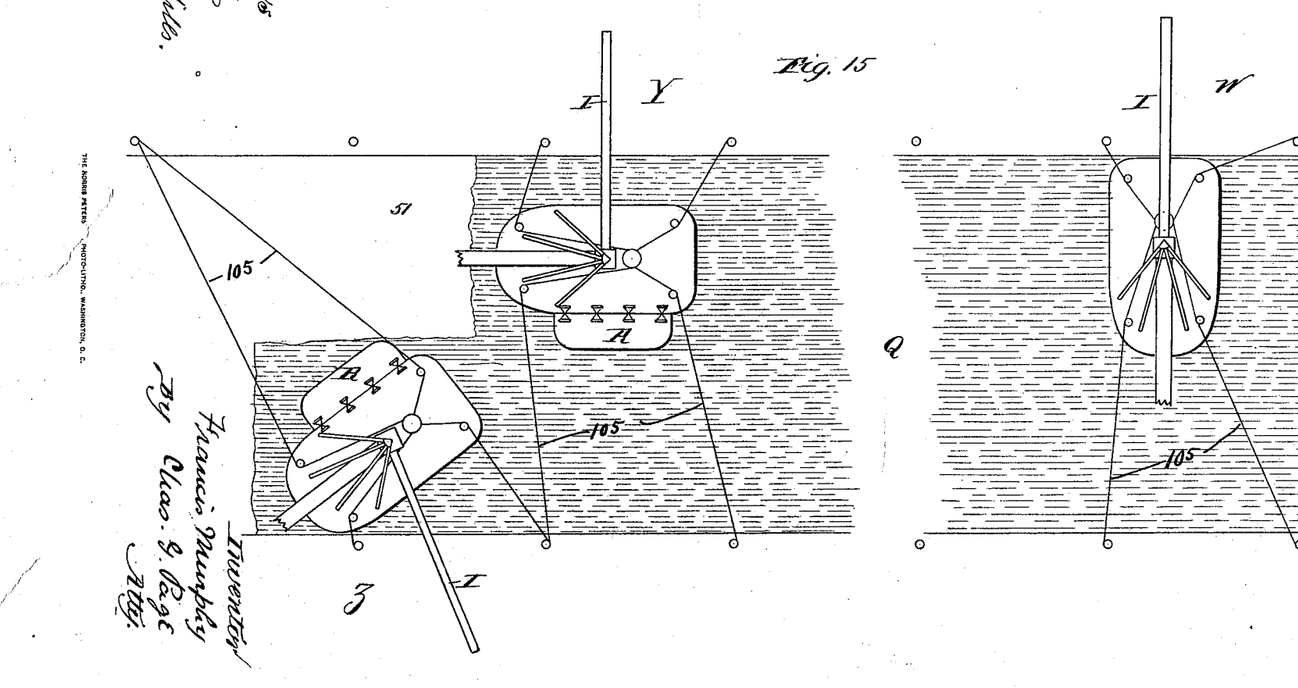
Fig. 15 comprises diagrams W, Z, and Y, illustrating the machine at work in different positions.

When the revolving tower K is adjusted so as to cause the discharging-conveyer I to extend back from the stern of the vessel, as in Diagram W, Fig. 15, the vessel will be balanced, since the weight of the triangular frame projecting forwardly from the bows of the vessel and carrying the excavating conveyer or endless chain of excavating-buckets will balance the weight of the conveyer I. It is, however, necessary in digging a canal to place the vessel in position other than crosswise of the stream or canal Q, as in Diagram W. Thus it is at times necessary to place the vessel parallel with the line of canal, as in Diagram Y, so that while the vessel is floating in the excavated portion Q of the canal the excavating-buckets can dig ahead into the ground at 51, and in such case it is necessary to adjust the tower so as to cause the conveyer I to project from a side of the vessel. In order, therefore, to counteract the weight of the conveyer and balance the machine as a whole, I secure to one side of the vessel by any convenient means a float R, which is of sufficient size and weight to maintain such balance.

For certain kinds of work—such as digging into cemented gravel banks or hardpan—a special construction of buckets should be used—such, for example, as the bucket 52 (shown in Fig. 14) and formed by prongs in place of plates.

With further reference to the excavating-buckets D, it may be stated that each bucket can be provided with a vent-hole closed by a plug D', as in Fig. 13, so that in digging up clay, for example, the plugs can be previously removed from the buckets, by which arrangement they will dump more readily, since in parting with their loads air can enter through the vent-holes.

The vessel can be held and adjusted by chains or cables 105, operated from the engine in any suitable way.

What I claim as my invention is—

1. A dredging-machine comprising a floating vessel provided with a ladder and an endless chain of buckets arranged for excavating ahead of the vessel and at a depth suitable to provide floatage for the same, a conveyer arranged for receiving the excavated material from the buckets and carrying the same toward the middle portion of the vessel, a rotary tower rising from the middle portion of the vessel and carrying a discharging-conveyer arranged to receive the excavated material from the first-named conveyer, the said tower being adapted for rotary adjustment, and an overhung discharging-conveyer extending from and wholly supported by the rotary tower, so that by adjusting the tower the discharging-conveyer can be swung over the rear portion of the vessel or brought into position to discharge either in rear of the stern of the vessel or onto the bank opposite either side of the same, substantially as described.

2. A dredging-machine comprising a vessel provided with an endless chain of excavating-buckets supported in front of the vessel and arranged to operate substantially for the purpose described, a revolving tower, a vertically-swinging adjustable discharging-conveyer pivotally supported upon the revolving tower, which serves, when revolved, to swing the discharging-conveyer laterally, so that said conveyer may discharge in rear of the stern and also alternately at opposite sides of the vessel, and an intermediate conveyer arranged for carrying material from the excavating-buckets to the discharging-conveyer, which latter, by reason of its pivotal connection with the tower, can be raised and lowered so as to vary the height of its discharge end, substantially as set forth.

3. A dredging-machine comprising a vessel provided with an endless chain of buckets supported by a ladder in front of the vessel, a revolving tower, a discharging-conveyer arranged to extend from the revolving tower, which can be operated so as to swing the discharging-conveyer into position for discharging alternately at opposite sides of the vessel, and a balancing-float arranged alongside of and attached to the vessel, said float being adapted to balance the vessel when the discharging conveyer is swung out from either side of the same, substantially as set forth.

4. In a dredging-machine, the swinging triangular frame C E F, extending forwardly from the vessel and carrying an endless chain of excavating-buckets supported upon the front side C of the frame, which constitutes the ladder, and a conveyer supported upon the upper side E of the frame and arranged to receive the material discharged from the excavating-buckets, substantially as set forth.

5. In a dredging-machine, the swinging triangular frame C E F, extending forwardly from the vessel and carrying an endless chain of excavating-buckets and a conveyer, the endless chain of excavating-buckets being supported upon a ladder formed by the front side C of the frame, which extends above the upper side E of the frame, and the conveyer being supported upon said upper side E of the frame, substantially as set forth.

6. The combination, in a dredging-machine, of the swinging triangular frame C E F, carrying an endless chain of buckets on its front side C, which forms the ladder, and a conveyer on its upper side E, and driving-chain connections between a driving-roll at the upper end of the ladder and an engine, substantially as set forth.

7. The combination, in a dredging-machine, of the swinging triangular frame pivotally supported at one corner upon the vessel and arranged to extend forwardly from the same, an endless chain of excavating-buckets D, supported by a ladder formed by the forward side C of the triangular frame, a conveyer H, arranged upon the upper side E of the triangular frame, a driving-chain passing from the engine to a pulley on a driving-roll 14 for the conveyer, driving connections, such as set forth, between said roll and a roll for driving the endless chain of excavating-buckets, and means suitable for raising and lowering the swinging frame, substantially as described.

8. The combination, in a floating dredging-machine, of the swinging triangular frame extending forwardly from the vessel and carrying an endless chain of excavating-buckets on its front side C and a conveyer on its upper side E, and a revolving tower carrying a discharging-conveyer arranged to receive material discharged from the conveyer on the triangular frame, said triangular frame being arranged to swing independently of the revolving tower, which serves as a means for swinging the discharging-conveyer horizontally, substantially as set forth.

9. The combination, in a dredging-machine, of a vessel provided with excavating-buckets arranged for digging ahead of the vessel, a revolving tower arranged upon the vessel, a vertically-swinging conveyer which is pivotally supported upon the revolving tower and which serves to discharge the material excavated by the buckets both in rear of the stern of the vessel and alternately at opposite sides of the same, chains or cables 22, connected with the conveyer-frame, and winding-drums for said chains or cables mounted upon the revolving tower, so that by operating the drums the discharge end of the conveyer can be varied in height with reference to the height of the bank alongside the vessel, substantially as set forth.

10. The combination, in a dredging-machine, of a vessel provided with excavating-buckets for digging ahead of the vessel, revolving tower arranged upon the vessel, a vertically-swinging discharging-conveyer pivotally supported upon the revolving tower and serving to discharge the material excavated by the buckets, chains or cables 22, connected with the conveyer-frame, and differently-sized winding-drums 24 for winding and unwinding the different chains or cables, substantially as set forth.

11. The combination, in a dredging-machine, of a revolving tower arranged upon the vessel, a vertically-swinging discharging-conveyer carried by the revolving tower, winding-drums mounted upon the revolving tower, chains or cables connecting the winding-drums with the conveyer-frame, a vertically-arranged driving-shaft gear connected with the winding-drums, and a suitable engine for operating said driving-shaft, substantially as set forth.

12. A dredging-machine comprising a vessel carrying means for excavating ahead of the vessel, so as to provide for floatage for the same, a revolving tower on the vessel, and a vertically-swinging discharging-conveyer arranged to extend from the revolving tower and provided at the outer end of its frame with an adjustable delivery-chute N for varying the point of discharge with reference to the banks alongside a canal which is being dug by the machine, substantially as described.

13. The combination, in a dredging-machine, of a discharging-conveyer carried by a revolving tower which is supported upon the vessel, an adjustable delivery-chute N, carried at the outer end of the conveyer-frame, and a chain or cable 32, connected with the chute as a means for adjusting the same, substantially as set forth.

14. The combination, in a dredging-machine, of a discharging-conveyer carried by a revolving tower which is supported upon the vessel, a swinging delivery-chute N at the outer end of the conveyer-frame, a link 30, connected with the chute, and a chain or cable connected with the link, substantially as and for the purpose set forth.

15. The combination, in a dredging-machine, of a discharging-conveyer carried by a revolving tower which is supported upon the vessel, a chute N, suspended from the conveyer-frame, a link 30, connected with the forward portion of the chute, and a chain or cable connected with the link 30, substantially as set forth.

16. The combination, in a dredging-machine, of a vessel carrying an endless chain of excavating-buckets for the purpose described, a conveyer H, arranged to receive the material discharged from the excavating-buckets at the forward end of the vessel, a revolving tower carrying a discharging-conveyer, and a hopper supported upon the revolving tower and arranged to receive the material from the conveyer H and direct the same into the discharging-conveyer, substantially as set forth.

17. A dredging-machine comprising a vessel carrying at its forward end an endless chain of excavating-buckets arranged for excavating ahead of the vessel, so as to provide floatage for the same, a conveyer arranged to receive the excavated material from the buckets, a discharging-conveyer supported near the center of the vessel and adapted to receive the excavated material from the first conveyer and arranged to swing over the rear portion of the same or into position to discharge onto the bank at either side of the vessel, one or more chutes arranged to receive the excavated material from the first-named conveyer, and means for directing the excavated material from the first conveyer either to the discharging-conveyer or to one of the chutes, said chute or chutes being located for side delivery at points closer to the vessel than the discharge can be effected from the discharging-conveyer, substantially as described.

18. The combination, in a dredging-machine, of a revolving tower carrying a discharging-conveyer, a conveyer H, a chute P, supported upon the vessel, and a hopper O, provided with an adjustable section 37 and arranged to direct the excavated material from the conveyer H to the discharging-conveyer, said adjustable section of the hopper being provided with a chute-section 39, substantially as and for the purpose described.

19. The combination, in a dredging-machine, of the conveyer H, the revolving tower carrying a discharging-conveyer, the hopper O, having an adjustable section 37, the chutes P, supported on the vessel, and the adjustable ways or chute-sections $39^a$ $39^b$, pivotally connected with the hopper-section, substantially as and for the purpose set forth.

FRANCIS MURPHY.

Witnesses:
   CHAS. G. PAGE,
   FREDK. H. MILLS.